United States Patent [19]

Neuf

[11] 3,831,097

[45] Aug. 20, 1974

[54] IMAGE RECOVERY RECEIVER

[75] Inventor: Donald Neuf, Wantagh, N.Y.

[73] Assignee: RHG Electronics Laboratory, Inc., Deer Park, N.Y.

[22] Filed: Feb. 23, 1973

[21] Appl. No.: 335,337

[52] U.S. Cl. ................. 325/446, 325/437, 329/153, 329/163

[51] Int. Cl. ................ H04b 1/26

[58] Field of Search .................... 325/430, 434–437, 325/446; 329/131, 133, 154, 163, 164; 332/43, 44, 48 R, 48 B; 321/65

[56] References Cited

UNITED STATES PATENTS

| | | | |
|---|---|---|---|
| 2,772,350 | 11/1956 | Deardorff | 325/435 |
| 3,665,508 | 5/1972 | Gawler | 325/446 |
| 3,681,697 | 8/1972 | Moroney | 325/446 |

OTHER PUBLICATIONS

"Single Sideband Principles And Circuits" - E. W. Pappenfus, Warren B. Bruene, E. O. Schoenike, McGraw-Hill, 1964, pages 50–52, 96, 97.

*Primary Examiner*—Richard Murray
*Assistant Examiner*—Marc E. Bookbinder
*Attorney, Agent, or Firm*—Leonard H. King

[57] ABSTRACT

An image recovery mixer system comprising two double balanced mixers each of the diode bridge type and having one set of opposing diagonals of one bridge interconnected with one set of opposing diagonals of the other set, thereby cancelling the image frequency signal directly between the diode mixers. The input RF signal can then be applied in phase to both mixers by means of a transformer or balun.

14 Claims, 2 Drawing Figures

PATENTED AUG 20 1974 3,831,097

IMAGE RECOVERY RECEIVER

The aforementioned Abstract is neither intended to define the invention of the application which, of course, is measured by the claims, nor is it intended to be limiting as to the scope of the invention in any way.

This invention relates to double balanced mixers and more particularly to an image recovery mixer using two double balanced mixers.

BACKGROUND OF THE INVENTION

In a mixer, an input signal is combined with a local oscillator signal to produce a primary output at the difference frequency referred to as the intermediate frequency. In providing a microwave mixer numerous unique problems are presented resulting from the high frequencies of the signals. To eliminate some of these problems balanced mixers are used. To achieve still better results, especially for providing isolation between the various signals, double balanced mixers are well known in the art. A typical double balanced mixer uses four diodes in a bridge arrangement. One such bridge arrangement, generally known as a ring modulator, has all of the diodes in the bridge poled in the same direction.

In mixers of this type the RF input signal and the local oscillator signal are fed through transmission lines to the bridge diodes in such phase relationship that the output signal is produced at the desired intermediate frequency. However, some of the energy at the intermediate frequency meets with energy at one of the two input frequencies to produce energy at a frequency differing from the original frequency by twice the intermediate frequency. This frequency is known as the image frequency. The image frequency signal propagates away from the mixer diodes to one of the input ports in a direction opposite to the incoming signal. The loss of energy resulting from the image frequency signals reduces the power of the primary output intermediate frequency signal.

In some prior art devices the image frequency signal has been eliminated by the use of filters at the input to the mixers. However, although the use of filters removed the image frequency signal from interfering with the input signals, it also provided an energy loss to the system and reduced the bandwidth. A reduction of the conversion loss of up to three DB for an ideal mixer has been known in the prior art by providing an open or short circuit at the diodes. In this manner the mixer is capable of recovering the image frequency energy. One type of image recovery mixer known in the art is described in U.S. Pat. No. 2,834,876 which utilizes the image frequency power as reflected from detector diodes placed in the antenna branch of the wave guide by a distance substantially equal to a ¼ wavelength at the image frequency. A further type of image recovery mixer is described in U.S. Pat. No. 3,681,697 which utilizes an energy coupling device at the input which transmits the input signal in proper phase to a pair of balanced mixers but reflects the image signals propagated backwards from the mixer to the coupler in equal and opposite phase thereby recovering the image frequency energy.

While the known devices are suitable for some applications they are all frequency dependent and therefore cannot be used for a multioctave bandwidth of frequencies. In the prior art mixers the image frequency signal must be propagated from the mixers back to one of the input ports. Accordingly, the extra coupling line links become very significant to the design of the mixer. The phase length of the separation between the termination at the input and the mixer diodes must be controled to be of a specified length related to the frequency of the signals. Furthermore, because the image signal is terminated and reflected at one of the input ports, it becomes necessary to use multi-port coupling devices at the input ports. Generally, a 180° hybrid is provided at the signal input port to permit the input signal to be sent in phase to each of the balanced mixers used while the reflected image frequency signal is shifted in one path by 180° to provide image termination at the input port. Because of the additional coupling device and the frequency dependent coupling line links, the prior art devices exhibit limited bandwidths and the noise figure improvement of these devices is very limited.

It is therefore an object of the present invention to eliminate the aforementioned problems of the prior art devices.

Still a further object of this invention is to provide an improved image recovery microwave mixer.

Yet another object of this invention is to provide a mixer which can be used at low frequencies or microwave frequencies depending upon the input transformers.

Still a further object of this invention is to provide a wideband image recovery mixer which is not dependent upon the length of the coupling line from the input to the mixer diodes.

A further object of the invention is to provide a wideband image recovery mixer wherein the input signal can be provided directly to the diodes of the mixers without the need of input multi-port coupling means.

Still a further object of the invention is to provide an image recovery mixer which eliminates the need of a hybrid coupler at the input port.

A further object of the invention is to provide an image recovery mixer in which opposing terminals of two double balanced diode mixers are directly interconnected to produce a short circuit or open circuit at the image frequency.

Still a further object of the invention is to provide a multioctave wideband image recovery mixer whose bandwidth is only limited by the local oscillator coupler and the output IF coupler.

Still a further object of the invention is to provide an image recovery mixer using two double balanced mixers which are interconnected to terminate the image frequency.

These and other objects of the invention will, become apparent from the following detailed description taken in conjunction with the accompanying drawings.

SUMMARY OF THE INVENTION

Briefly, the invention comprises two double balanced diode mixer arrangements whose individual diodes are arranged in a bridge having opposite pairs of terminals. One set of opposing terminals from one diode bridge mixer is directly interconnected with a set of opposing terminals of the other diode mixer bridge arrangement. The input RF signal is applied directly to each of the bridge arrangements in phase. The local oscillator signal is applied through a quadrature coupler to the other set of opposing terminals of each of the bridge arrangements. The individual IF output signals are taken from each bridge output and passed through another quadrature coupler to provide a signal IF output signal.

In one embodiment the RF signal input is fed in shunt to both diode bridge arrangements and the diode bridges being in parallel with each other provide image frequency output signals which are equal but opposite to each other. This effectively provides a short circuit at the diode bridges for the image frequency. In another embodiment of the invention the RF signal input is fed in series to the diode bridges and the image signal outputs of the diode bridges are in series phase opposition and thereby tend to cancel each other providing an effective open circuit at the image frequency. For low frequency use the input signal and the output signal can be taken across transformers and the quadrature hybrid couplers could be replaced with 90° delay networks. For microwave frequency use baluns could be used as described in U.S. Pat. Nos. 3,652,941 and 3,710,268, both of which were issued to the applicant of the present invention.

DESCRIPTION OF THE DRAWING

In te figures of the drawing like reference characters designate like parts. In the drawing.

DETAILED DESCRIPTION OF THE INVENTION

Figure 1:
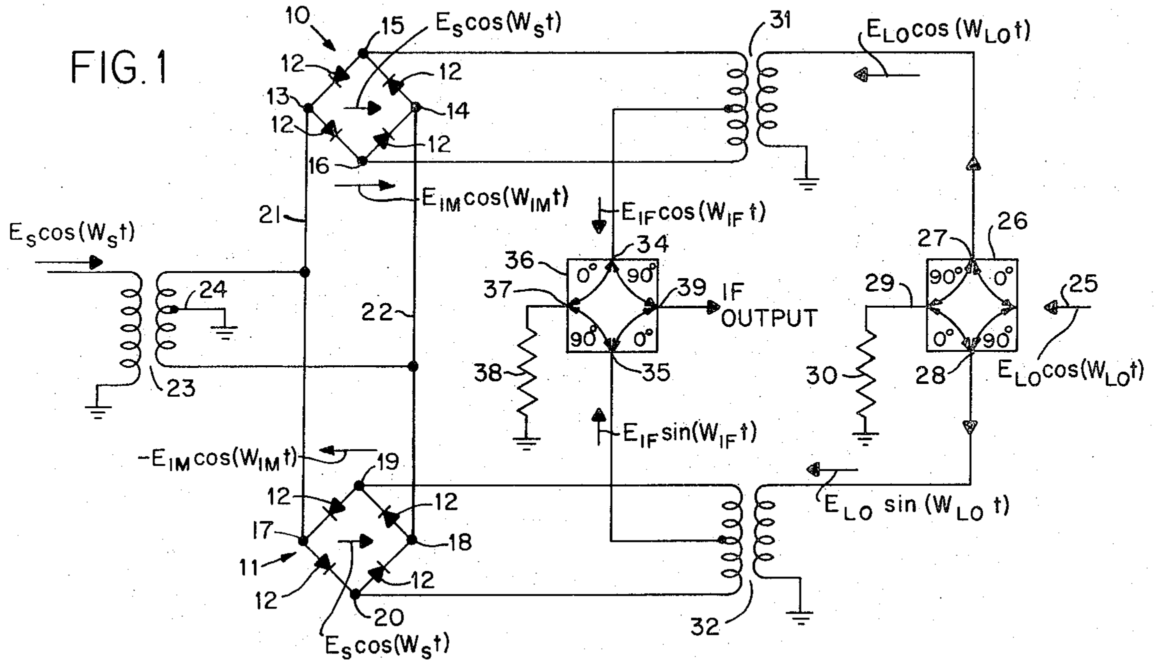
FIG. 1 is a schematic circuit diagram of one embodiment of the invention.

Referring now to FIG. 1 there is shown one embodiment of the invention wherein first and second mixers 10 and 11 each comprise four identical diodes 12 arranged in a bridge circuit. Mixer 10 has a first set of opposing terminals 13, 14 and a second set of opposing terminals 15, 16. Similarly, mixer 11 has a first set of opposing terminals 17, 18 and a second set of opposing terinals 19, 20. Each of the diodes 12 are poled within their respective bridge circuits in the same direction to effectively produce a ring modulator circuit. Although the embodiment shown has a specific poling arrangement, it is understood by those skilled in the art that it is possible to have each bridge arranged with two sets of diodes in shunt arrangement with each other and still obtain the characteristics of the diode mixer. The shunt type diode arrangement is described and explained in the aforementioned U.S. Pat. No. 3,710,268. As shown in the drawing, one set of terminals 13, 14 from bridge 10 and one set of terminals 17, 18 from bridge 11 are interconnected by means of lines 21 and 22. In the practical embodiment, lines 21, 22 are created by the interconnection of the leads of the adjacent diodes. The resulting line length is negligible at the operating frequency.

An input signal $E_s \cos (W_s t)$ is incident upon the mixer arrangement across the primary winding of transformer 23. The secondary of the transformer is center grounded at 24. The secondary of the transformer 23 is placed in parallel with the two diode bridge arrangements by connecting the ends of the secondary to lines 21 and 22.

A local oscillator signal $E_{LO} \cos (W_{LO} t)$ is applied to an input port 25 of a quadrature hybrid coupler 26 having three output ports 27, 28 and 29. Port 29 is connected to a matched load 30 as shown. Wave energy, in passing from port 25 to port 26, experiences no phase shift, whereas it experiences a 90° phase shift in passing from port 25 to port 28. Consequently, the local oscillator signal applied to the bridge 10 from port 27 will be $E_{LO} \cos(W_{LO} t)$, which has the same phase relationship as the input to the quadrature hybrid coupler 26. The signal applied to the mixer 11 is $E_{LO} \mathrm{Sin}(W_{LO} t)$ which is 90° shifted from the input to the quadrature hybrid coupler 26.

The signal from port 27 of hybrid coupler 26 passes through transformer 31 whose secondary is connected across the set of terminals 15 and 16 of the diode bridge mixer 10. In a similar manner the output signal from port 28 of hybrid coupler 26 passes through transformer 32 whose secondary is connected across the opposing terminals 19, 20 of the diode bridge mixer 11. The output intermediate frequency from diode bridge 10 is taken from the midpoint of the secondary of transformer 31. Similarly, the output from the diode bridge mixer 11 is taken from the center of the secondary of transformer 32. Each of these output intermediate frequencies from their respective mixers are applied to two ports 34, 35 of an intermediate frequency quadrature hybrid coupler 36. Hybrid coupler 36 includes ports 37 connected to a matched load 38 and an output port 39. The wave energy in passing from port 34 to port 39 is shifted in phase by 90°, but that passing from port 35 to port 39 is not shifted in phase. Since the output intermediate frequencies from each of the mixers 10, 11 are 90° out of phase with each other, as these respective IF outputs pass through the quadrature hybrid coupler 36, they are combined into the same phase and comprise a signal output intermediate frequency from port 39.

As has been described each of the diode bridge mixers 10 and 11 are double balanced bridge arrangements. The input RF signals $E_s \cos(W_s t)$ is applied in parallel to each of the double balanced bridges and the same phase relationship between the input RF signals exist in both bridges. The local oscillator signal $E_{LO} \cos (W_{LO} t)$ is applied to diode bridge 10 and a 90° phase shifted local oscillator signal $E_{LO} \mathrm{Sin}(W_{LO} t)$ is applied to the diode bridge 11. The image frequency signal produced by the diode bridge 10 will be $E_{IM} \cos (W_{IM} t)$ while the image frequency signal produced by the diode bridge 11 will be equal but of opposite phase being $-E_{IM} \cos (W_{IM} t)$ so that the image signals will cancel each other thereby providing a short circuit equivalent at the image frequency at each of the diode bridge mixers. The output IF signal from the diode mixer 10 is $E_{IF} \cos(W_{IF} t)$ which passes through a 90° phase shift thereby making it in phase with the output from diode bridge 11 which is $E_{IF} \mathrm{Sin}(W_{IF} t)$ and is not phase shifted as it passes through the hybrid 36.

Figure 2:
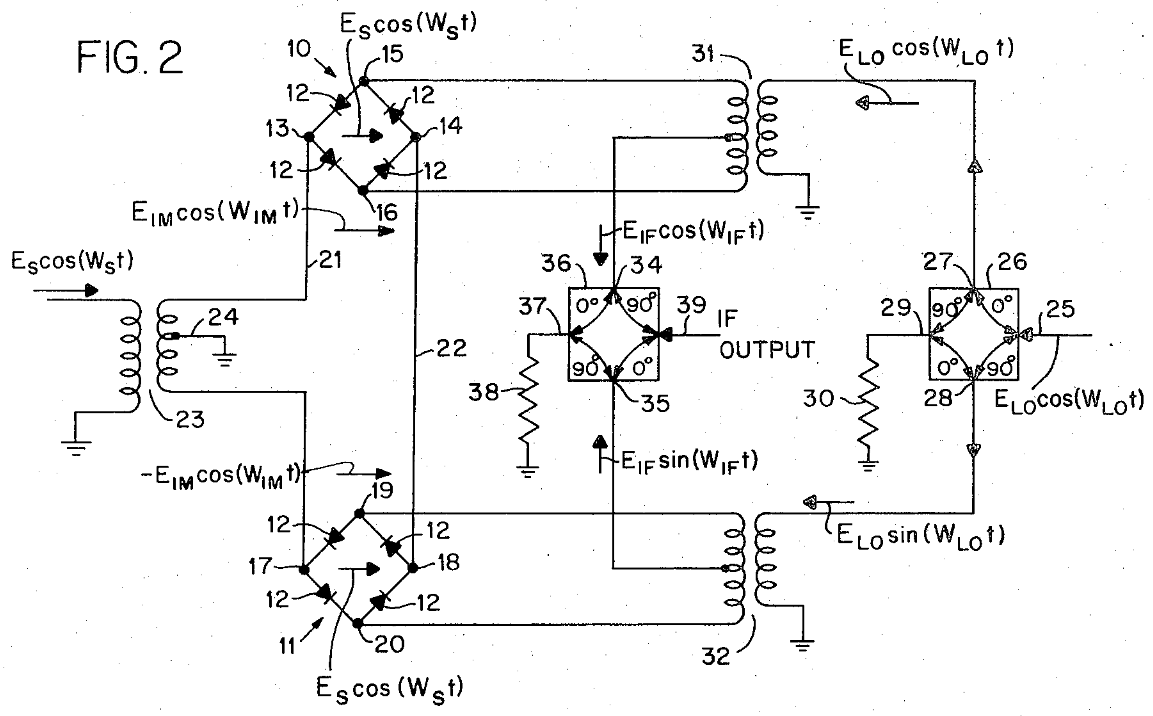
FIG. 2 is a schematic diagram of another embodiment of this invention.

Referring now to FIG. 2 there is shown another embodiment of the invention wherein like parts are shown by like numerals as in FIG. 1. In this embodiment the signal input $E_s \cos(W_s t)$ is provided in series to both diode mixers 10 and 11. This is accomplished by placing the secondary of transformer 23 in series with line 21 which is interconnecting terminal 13 of bridge 10 and terminal 17 of bridge 11. Again the signals provided to both mixers are in phase and the image frequency signals produced by each of the diode mixers 10, 11 are in series phase opposition and tend to cancel each other. Thus, while image frequency signals do exist across each diode bridge, no net current flows thereby resulting in an equivalent open circuit at the image frequency each diode bridge.

Although transformers 23, 31 and 32 are shown coupling the signals to the diode bridge arrangements, such would be the situation generally for a low frequency double balanced mixer. For a microwave double balanced mixer it would be necessary to use frequency baluns some of which are described in the aforementioned U.S. patents. Also, the IF outputs from the mixers would be taken directly across the terminals as is described in those patents. Furthermore, as is well known in the art, although quadrature hybrid couplers have been shown for the local oscillator signal and the IF output signal, 90° delay networks could be introduced at low frequencies to acheive the same results.

It is therefore seen that the image frequency signal energy is recovered directly at the bridge diode quads without the necessity of reflecting the energy back to the input port. Thus, there is no requirement of having coupling lines of fixed phase lengths between the input signal and the mixer diodes. Furthermore, since the image frequency signal need not be reflected back to the input port for termination, there is no need to have a hybrid coupler at the input port of the RF signal but instead the RF signal can be applied directly in phase relationship to the bridge arrangements by means of a simple transformer or balun. This also eliminates additional frequency limitations usually imposed upon such a mixer by the additional hybrid coupling device. The elimination of these frequency restrictions and the resulting improvement in both bandwidth and noise figure is obtainable because of the use of the double balanced bridge arrangement for the mixers and the realization that these mixers can be interconnected to effectively cancel out the image frequency signals directly at the mixers thereby recovering the image frequency energy. The arrangement of this invention results in a multioctave bandwidth capability wherein the bandwidth is limited only by the local oscillator hybrid and the IF hybrid which could be as high as 10 to 1 bandwidth. Furthermore, in a microwave configuration baluns can be used to provide 0.5 to 20 $GH_z$ bandwidth in conjunction with the configuration as has heretofore been shown.

There has been disclosed heretofore the best embodiments of the invention presently contemplated. However, it is to be understood that various changes and modifications may be made by those skilled in the art without departing from the spirit of the invention.

What I claim as new and desire to secure by Letters Patent is:

1. An image recovery mixer system comprising first and second double balanced mixers each mixer having four substantially matched diodes forming a bridge arrangement of four arms and first and second pairs of diagonally opposing terminals therebetween, a first means characterized by the absence of phase shifting for directly supplying a first input signal in phase to the first pair of diagonally opposing terminals of each of said bridge arrangements;

a first coupling means having one of its ports for receiving a local oscillating signal and having two ports serving as outputs connected respectively to the second pair of diagonally opposing terminals of each of said bridge arrangements;

output means for obtaining the IF outputs from the second pair of diagonally opposing terminals of each of said bridge arrangements;

a second coupling means having two ports connected respectively to said IF outputs and an output port, said second coupling means combining said IF outputs and providing a system IF output at said output port; and means independent of said second coupling means and said output means, interconnecting said first pair of diagonally opposing terminals from said first to said second bridge arrangements for recovering the energy from the image frequency signals generated within said mixers.

2. A system as in claim 1 and wherein said output means comprise first and second transformer means interconnecting respectively the two output ports from the first coupling means and the second pairs of diagonally opposing terminals of said bridge arrangements, and wherein said IF outputs are each taken from a tapped secondary of said first and second transformer means.

3. A system as in claim 2 and wherein said first means, and said first and second transformer means are baluns.

4. A system as in claim 1 wherein said first means includes transformer means whose secondary is coupled in shunt between the interconnected first pairs of terminals of said first and second bridges.

5. A system as in claim 1 wherein said first means includes transformer means and whose secondary is coupled in series with the interconnected first pairs of terminals of said first and second bridges.

6. A system as in claim 1 wherein said first and second coupling means are each a quadrature microwave hybrid junction each having a fourth port connected to a terminating impedance.

7. A system as in claim 1 wherein said first and second coupling means are each 90° delay networks.

8. A system as in claim 1 wherein said matched diodes are poled in the same direction within each respective bridge to form a ring modulator arrangement.

9. An image recovery mixer system comprising first and second double balanced mixers each adapted to receive an RF input, an LO input, and producing an IF output and an image frequency output;

first means directly supplying the RF signal in phase to both said mixers;

first coupling means supplying the LO signal to said mixers in 90° phase relationships;

second coupling means receiving the IF output from said mixers, shifting by 90° the phase of one of the IF outputs and combining the IF outputs, and means independent of said second coupling means, directly interconnecting the image frequency outputs of said mixers to recover the energy from the respective image frequency signals generated within said mixers.

10. A system as in claim 9 wherein said double balanced mixers include diode bridge arrangements.

11. A system as in claim 9 wherein said RF signal is applied in parallel to said mixers.

12. A system as in claim 9 wherein said RF signal is applied in series to said mixers.

13. A system as in claim 9 wherein said first means includes a balun.

14. In a microwave system including an RF source and an LO source, an image recovery mixer comprising first and second double balanced mixers each mixer having four substantially matched diodes forming a bridge arrangement of four arms and first and second pairs of diagonally opposing terminals therebetween, a first means characterized by the absence of phase shifting for directly supplying the RF signal in phase to the first pair of diagonally opposing terminals of each said bridge.

a first coupling means having one of its ports for receiving said LO signal and having two ports serving as outputs connected respectively to the second pair of diagonally opposing terminals of each of said bridge arrangements;

output means for obtaining the IF outputs from the second pair of diagonally opposing terminals of each of said bridge arrangements;

a second coupling means having two ports connected respectively to said IF outputs and an output port, for said second coupling means combining said IF outputs and providing a system IF output at said output port; and means independent of said second coupling means and said output means, interconnecting said first pair of diagonally opposing terminals from said first to said second bridge arrangements for recovering the energy from the image frequency signals generated within said mixers.

* * * * *